April 27, 1965  J. F. GIBBONS  3,180,803
BOILING WATER REACTOR WITH DIVIDED CORE
Filed Dec. 20, 1960
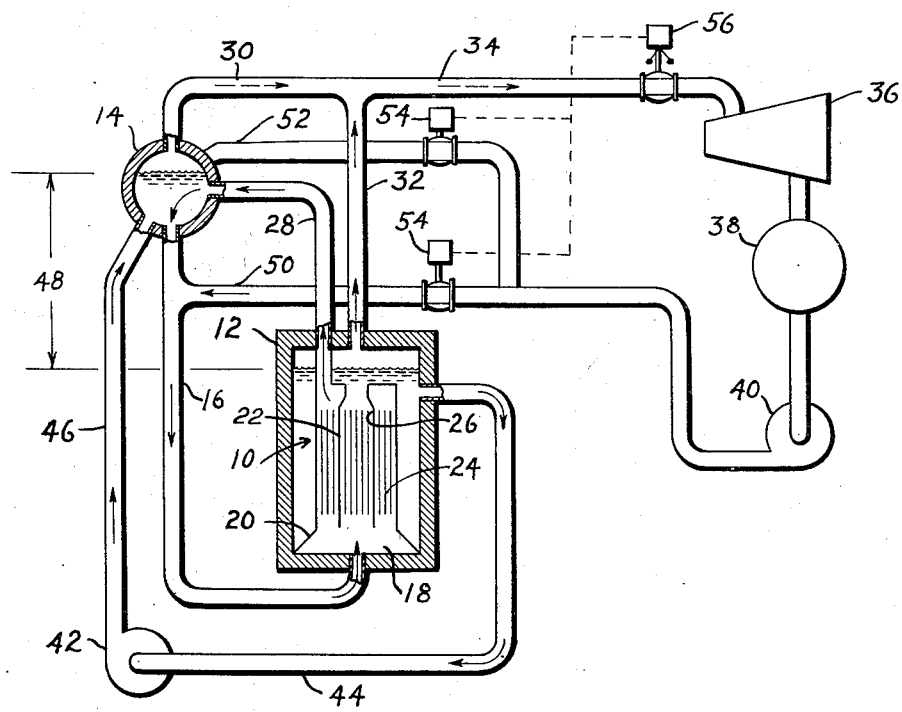
INVENTOR.
John F. Gibbons
BY Eldon H. Luther
ATTORNEY

United States Patent Office 3,180,803
Patented Apr. 27, 1965

3,180,803
BOILING WATER REACTOR WITH
DIVIDED CORE
John F. Gibbons, Dunedin, Fla., assignor, by mesne assignments, to Combustion Engineering, Inc., a corporation of Delaware
Filed Dec. 20, 1960, Ser. No. 77,061
5 Claims. (Cl. 176—56)

This invention relates generally to nuclear reactors and has particular relation to an improved boiling water reactor organization.

In boiling water reactors the coolant is circulated through the core of the reactor with a portion of the coolant being vaporized during its traverse of the core. This coolant is generally either light or heavy water, although other vaporizable fluids may be employed. The steam thus developed is separated from the steam and water mixture egressing from the reactor core and is conveyed to a suitable point of use which may be a power utilization device such as a turbine if a direct cycle is employed or it may be a heat exchanger if an indirect cycle is employed or if the system is employed for process or other heating purposes.

It is necessary to insure that adequate cooling of the core is provided with this being dependent upon providing inadequate circulation of the coolant through the core. Both natural and forced circulation boiling water reactors have been proposed and constructed with each having certain advantages as well as certain disadvantages. In the natural circulation system the head that is developed is limited to that which can be provided by the difference in density between the downtake and uptake leg of the system. Under certain conditions this head is not sufficient to meet the cooling requirements. While a forced circulation system does not have this limitation but will insure that adequate cooling is provided, forced circulation loops are relatively costly, particularly when the pump must handle all of the coolant that is passed through the core and moreover in the event of a pump failure circulation ceases unless special provision is incorporated in the system to maintain a limited circulation during and immediately following scram of the reactor.

The present invention is directed to a reactor system which employs what may be termed a circulation pump but wherein the circulation through the reactor is not wholly and completely dependent upon operation of the pump. In accordance with the invention the reactor core, which is disposed within a suitable pressure vessel, is partitioned into a plurality of vertically extending passageways such as a passageway extending through the central portion of a core and a passageway which includes an outer core portion disposed about the central core portion. A circulating arrangement is provided for passing water in parallel flow relation up through these vertically disposed passageways and this arrangement includes a drum mounted exteriorly of the pressure vessel and disposed at an elevation substantially higher than that of the core. This drum is connected by means of a downcomer with the lower region of the reactor pressure vessel wherein is formed a suitable plenum chamber in which the lower end of the core passageways communicate. Some of the core passageways communicate at their upper end with the drum while others are open at their upper end to the reactor pressure vessel. In the aforementioned example the outer passageway may be connected with the drum through a suitable uptake while the inner passageway may be open to the pressure vessel.

Water is pumped by means of a suitable pump from the reactor pressure vessel into the elevated drum. Steam is conveyed from the pressure vessel and from the drum to a suitable point of use which may be a turbine and feedwater is supplied to the system with this feedwater preferably being proportioned between the steam space in the drum and the downtake or water space of the drum so as to provide at least a limited control of the power output of the reactor.

With this organization a substantial head is provided for circulating water through the core of the reactor with the circulation not being completely dependent upon the operation of a pump and furthermore with this arrangement a steam and water separation is effected at two different locations while being able to take advantage of the increased circulating head provided by the raised drum. Furthermore there is a more positive circulation provided for the central (high power density) region of the reactor core when the central region opens at its upper end into the reactor pressure vessel.

Accordingly it is an object of this invention to provide an improved boiling water reactor organization.

Other and further objects of the invention will become apparent to those skilled in the art as the description proceeds.

With the aforementioned objects in view, the invention compromises an arrangement, construction and combination of the elements of the inventive organization in such a manner as to attain the results desired as hereinafter more particularly set forth in the following detailed description of an illustrative embodiment, said embodiment being shown by the accompanying drawing wherein the single figure is a diagrammatic representation of a reactor embodying the present invention.

Referring now to the drawing, wherein like reference characters are used throughout to designate like elements, the illustrative and preferred embodiment of the invention depicted therein includes a boiling water reactor comprised of a core 10 mounted within pressure vessel 12. As is conventional, the core is comprised of a large number of vertically extending, spaced fuel members which are mounted between upper and lower grid plates or otherwise held in position within the core. Fluid is circulated upwardly through the core and for this purpose there is provided drum 14 mounted well above core 10 and from which depends the downcomer 16 which is connected to the lower end of pressure vessel 12 and communicates with the plenum chamber 18 formed in the lower end of this vessel. This chamber is formed by means of the wall member 20 and the entire area of the core is open at its lower end to this chamber.

In the illustrative embodiment, the core of the reactor is divided into two vertically extending passageways 22 and 24 with passageway 22 extending upwardly through the central region of the core while passageway 24 extends in coaxial relation with and surrounds the central passageway 22. The core may be circular or hexagonal, or any other desired configuration, in transverse section and the passageway 22 occupies the central region of the core while passageway 24 occupies the outer region or portion of the core. These passageways are separated by the baffle or wall member 26 and the effluent from the passageways is conveyed to separate locations. As embodied the outer passageway 24 communicates at its upper end with drum 14 through uptake 28 while the inner passageway 22 opens directly at its upper end into interior of pressure vessel 12.

Water is conveyed down through the downtake 16 into plenum chamber 18 and then in parallel flow relation through the passageways 22 and 24. The steam and water effluent emerging from passageway 24 is conveyed through uptake 28 to drum 14 where the steam is separated from the water, while the steam and water effluent from the central passageway 22 is conveyed into the interior of drum 12 wheren the steam is separated from the water. From drum 14 steam is conveyed through conduit 30 and from pressure vessel 12 steam is conveyed to conduit 32 with the steam passing from these conduits through conduit 34 to the turbine 36. The discharge from turbine 36 is conveyed to condenser 38 and this water, which is subcooled, is pumped from this condenser back into the reactor system by means of feedwater pump 40.

Water is continuously pumped from pressure vessel 12 to the elevated drum 14 and for this purpose circulating pump 42 has its inlet connected with the pressure vessel 12 through conduit 44 and its outlet connected with drum 14 through conduit 46.

It will be appreciated that by having drum 14 elevated an increased head is provided for the circulation of water through the core of the reactor. The head provided for circulating water through the outer passageway 24 is that developed by the difference in density between the water in downtake 16 and the steam and water mixture in passageway 24 and uptake 28. Since the reactor will operate in such a manner that the pressure in the upper region of pressure vessel 12 will be generally equal to the pressure in the drum 14 the head which provides for circulation through the central passageway 22 of the core will be that established by the difference in density between the water in downtake 16 and the steam and water in the central passageway together with the head provided by the difference in elevation between the water level in drum 14 and the water level in pressure vessel 12 with this head being identified as 48. Accordingly there will be a greater head and therefore a more positive circulation through the central region of the core, i.e. passageway 22, than the outer region of the core, i.e. passageway 24, in the illustrative design. This is advantageous since the central core region is the region of greatest power density in the core. However it is to be understood that, if desired, the arrangement may be reversed with the central core region communicating with drum 14 and the outer core arrangement being opened at its upper end to the interior of the pressure vessel with this arrangement having an advantage from a construction standpoint. Each of these arrangements provides a substantial circulating head because of the raised position of the drum while utilizing two locations for separation of the steam and water mixture with one location being the pressure vessel.

The power output of the reactor may be adjusted by controllably proportioning the feedwater from pump 40 between a location where it is injected into the steam in the drum 14 or the steam in the pressure vessel 12 and a location where it is introduced into the water that passes up through the core. In this latter instance there will be a subcooling effect by the feedwater with the amount of subcooling varying the reactor power output in a known fashion, i.e. the greater the subcooling the greater the power output of the reactor. When the feedwater is introduced into the steam it will be heated to saturation so it will have no subcooling effect. As illustrated, the feedwater is introduced either into downtake 16 through conduit 50 or into the steam space in drum 14 through conduit 52 with valves 54 controlling such introduction. These valves may be regulated through a suitable regulator 56 which responds to the load on turbine 36 and the valves may be adjusted to allow a greater proportion of the feedwater to be introduced into downtake 16 in order to increase the power output of the reactor and a lesser proportion so introduced in order to decrease the power output.

In accordance with the system of the invention the pump 42 is required to handle substantially less water than in a forced circulation reactor system wherein the pump must pump all of the water through the core of the reactor with boiling water reactors necessarily having a high circulation ratio and accordingly requiring a substantial pumping capacity to provide a forced circulation system. While pump 42 is required to handle substantially less water than the forced circulation system, because of the elevated position of drum 16 a substantial circulating head is provided for circulating the water through the reactor core and at the same time two separate locations are utilized for separating steam and water with the reactor pressure vessel being utilized for this purpose and providing one of these locations.

While I have illustrated and described a preferred embodiment of my invention it is to be understood that such is merely illustrative and not restrictive and that variations and modifications may be made therein without departing from the spirit and scope of the invention. I therefore do not wish to be limited to the precise details set forth but desire to avail myself of such changes as fall within the purview of my invention.

What I claim is:

1. A boiling water nuclear reactor comprising a pressure vessel, a core disposed in the vessel, a steam and water drum above said core, pump means connected to withdraw water from said vessel and supply said water to said drum, means for conveying water from said drum to the lower end of the vessel for passage up through the core therein, means forming a separate flow path up through a core region disposed about a central region, this last-named means receiving a portion of said water, means conveying the steam and water effluent from said core region to the drum wherein the steam is separated from the water, means whereby the effluent from a central core region is discharged into said vessel wherein the steam is separated from the water and means conveying steam from the drum and the vessel to a point of use.

2. A boiling water nuclear reactor having an upright core disposed in a suitable reactor vessel and a circulation system for circulating water upwardly through the core constructed and arranged to provide a more positive circulation through the central region than the outer region disposed thereabout, said system being characterized by a drum higher than the core, means conveying water down from said drum and up through the core, means conveying the effluent of steam and water from the outer portion of the core back to said drum, means directing the effluent of steam and water from the remaining portion into said reactor vessel and separating the two therein, pump means effective to withdraw water from said vessel and introduce it into said drum and means for conveying steam from said drum and said vessel to a point of use.

3. A boiling water nuclear reactor having an upright core disposed in a suitable reactor vessel, means dividing the core into a number of separate generally vertical passages in parallel flow relation, a common supply for supplying water to and directing it up through said passages, said supply including a drum disposed above the core and means for conveying water from the drum to the lower end of the core, pump means operative to convey water from the reactor vessel to the drum, means directing the steam and water effluent from one of the separate vertical passages to said drum where the steam is separated from the water, another of the passages being open at its upper end to the vessel interior for discharge of the steam and water effluent thereinto and means conveying steam from the drum and the vessel to a point of use.

4. A boiling water nuclear reactor comprising a reactor pressure vessel having housed therewithin a generally vertically disposed core comprised of spaced longitudinally extending fuel members, means dividing the core into a plurality of vertically extending passages, a drum disposed at an elevation above that of the core, a plenum chamber with which the lower end of each of the passages in the core communicate, downcomer means conveying water from the drum to said plenum chamber, means conveying the effluent from one of the passageways in the core to said drum, another of said passageways being opened at its upper end into the reactor pressure vessel, pump means effective to convey water from the reactor pressure vessel to said elevated drum, and means operative to convey steam from the drum and from the reactor pressure vessel to a suitable point of use.

5. A boiling water nuclear reactor comprising a reactor pressure vessel having housed therewithin a generally vertically disposed core comprised of spaced longitudinally extending fuel members, means dividing the core into a plurality of vertically extending passages which are in internested relation, a drum disposed at an elevation above that of the core, a plenum chamber with which the lower end of each of the passages in the core communicate, downcomer means conveying water from the drum to said plenum chamber, means conveying the effluent from one of the passageways in the core to said drum, the central most passageway being opened at its upper end into the reactor pressure vessel, pump means effective to convey water from the reactor pressure vessel to said elevated drum, and means operative to convey steam from the drum and from the reactor pressure vessel to a suitable point of use.

References Cited by the Examiner
UNITED STATES PATENTS

| 2,957,815 | 10/60 | Pacault et al. | 60—108 |
|---|---|---|---|
| 2,986,508 | 5/61 | Vernon | 176—44 |

FOREIGN PATENTS

| 219,722 | 1/59 | Australia. |
| 1,190,224 | 3/59 | France. |
| 1,198,728 | 12/59 | France. |
| 1,027,338 | 4/58 | Germany. |
| 1,051,425 | 2/59 | Germany. |
| 792,171 | 3/58 | Great Britain. |
| 799,725 | 8/58 | Great Britain. |

CARL D. QUARFORTH, *Primary Examiner.*

REUBEN EPSTEIN, *Examiner.*